(12) United States Patent
Mayor et al.

(10) Patent No.: US 6,859,463 B1
(45) Date of Patent: Feb. 22, 2005

(54) METHODS AND APPARATUS FOR ORGANIZING SELECTION OF OPERATIONAL PARAMETERS IN A COMMUNICATION SYSTEM

(75) Inventors: Michael A. Mayor, Fort Wayne, IN (US); Donald J. Rasmussen, Fort Wayne, IN (US); Eric A. Whitehill, Fort Wayne, IN (US); Charles A. Simmons, Fort Wayne, IN (US); Dennis McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 822 days.

(21) Appl. No.: 09/708,189

(22) Filed: Nov. 8, 2000

Related U.S. Application Data (60) Provisional application No. 60/164,137, filed on Nov. 8, 1999.

(51) Int. Cl.[7] .............................................. H04L 12/413
(52) U.S. Cl. ...................... 370/445; 370/252; 370/328; 370/338; 375/141; 455/434; 709/241; 709/243
(58) Field of Search ................................. 370/230, 252, 370/318, 445, 331–333, 328, 447–449, 461–462, 346, 338; 375/141, 145; 455/432–436, 456.1, 452.1; 709/238, 241, 242–243

(56) References Cited

U.S. PATENT DOCUMENTS

| | | | |
|---|---|---|---|
| 5,640,414 A | * 6/1997 | Blakeney et al. | ........... 375/130 |
| 5,696,903 A | 12/1997 | Mahany | |
| 5,701,294 A | 12/1997 | Ward et al. | |
| 5,974,236 A | * 10/1999 | Sherman | ..................... 709/221 |
| 6,038,448 A | * 3/2000 | Chheda et al. | .............. 455/436 |
| 6,072,778 A | * 6/2000 | Labedz et al. | .............. 370/252 |
| 6,097,703 A | * 8/2000 | Larsen et al. | ............... 370/254 |
| 6,132,306 A | 10/2000 | Trompower | |
| 6,154,489 A | * 11/2000 | Kleider et al. | .............. 375/221 |
| 6,421,374 B2 | * 7/2002 | Blakeney et al. | ........... 375/220 |
| 6,445,917 B1 | * 9/2002 | Bark et al. | .................. 455/423 |
| 6,708,042 B1 | * 3/2004 | Hayakawa | .................. 455/522 |

FOREIGN PATENT DOCUMENTS

| | | |
|---|---|---|
| EP | 0 627 827 A2 | 12/1994 |
| EP | 0 924 890 A2 | 6/1999 |
| WO | WO 99/12302 | 3/1999 |

* cited by examiner

*Primary Examiner*—Brian Nguyen
*Assistant Examiner*—Tri H. Phan
(74) *Attorney, Agent, or Firm*—Edell, Shapiro & Finnan, LLC (57) ABSTRACT

Operational parameters for transmitting a signal over a communication channel of a network are selected by first determining RF conditions on the communication channel from a received signal transmitted over the communication channel. An initial set of parameter values is selected for transmitting the signal based on RF conditions determined from the received signal. The initial set of parameter values is used to identify other sets of parameter values as other potential candidates for transmitting the signal. The parameter values in the other sets of parameter values differ from parameter values in the initial set of parameter values by less than a predetermined amount. The expected performance of the candidate sets of parameter values is compared to determine which set of parameter values has the best expected performance among the candidate sets of parameter values. The signal is transmitted on the communication channel using the selected set of parameter values.

44 Claims, 8 Drawing Sheets

METHODS AND APPARATUS FOR ORGANIZING SELECTION OF OPERATIONAL PARAMETERS IN A COMMUNICATION SYSTEM

CROSS REFERENCE TO RELATED APPLICATION

This application claims priority from U.S. Provisional Patent Application Ser. No. 60/164,137 entitled "Self Synchronizing And Configuring Mobile Multimedia Communications System Without a Base Station," filed Nov. 8, 1999. The disclosure of this provisional patent application is incorporated herein by reference in its entirety.

BACKGROUND OF THE INVENTION

1. Field of the Invention

The present invention relates to methods and apparatus for organizing selection of operational parameters in communication systems and, more particularly, to techniques for coordinating selection of parameters used to communicate between network nodes on a message-by-message basis by performing vector transformations of parameters organized into system state vectors, as a function of observed communication channel characteristics, operational requirements, and pre-computed performance data.

2. Description of the Related Art

The purpose of any communication system is to effectively transmit and receive information over a particular channel or communication medium. As mobile communication devices are increasingly used and the need for reliable and continuous communications systems becomes greater, government, military and industry leaders alike are working to solve sophisticated problems in a reliable and cost-effective manner. For instance, certain communications problems are often encountered in commercial and military applications where the communications network is required to maintain a reliable and continuous (uninterrupted) high data rate radio frequency (RF) communications in harsh environments, while network members (nodes) are consistently on the move. Furthermore, it is often desirable to establish and maintain communications without the aid of a base station or any other reference signal over the air. For example, in modem battlefield communications where troops are constantly on the move, the communication system is often subjected to intentional jamming or unintentional interference. In addition, potentially severe multipath interference conditions may limit or severely cripple strategic communication lines. Such communication systems are often ineffective if they rely on synchronization signals, as such signals may be detected and exploited by an adversary. Moreover, military operations occur in a variety of environments including indoors, outdoors, urban, suburban and exurban environments where propagation signal characteristics vary greatly. Similarly, commercial systems working in overcrowded frequency bands also encounter interference difficulties which prevent maintaining reliable communications.

Communications systems such as Cellular Communications, personal communications systems (PCS) and wireless local area networks (LANs) are examples of systems and applications designed to solve such mobile communications problems. However, certain significant drawbacks associated with each of the above communications systems exist. First, cellular communications rely on fixed base stations to establish and maintain communications among the mobile units. In this environment, all communications are routed to and from the base station. In addition, base stations aid in performing multipath countermeasures implemented in those systems. The same concept is applied in personal communications systems.

Wireless LANs can operate in a peer-to-peer manner in a limited area, but require a time synchronization signal emitted by the access points for extended service. Additional shortcomings of these systems include the fact that the use of base stations, whether fixed or mobile, constitutes a single point of failure, and base stations are not compatible with highly mobile networks. Furthermore, a base station presents a conspicuous target, from the electromagnetic emissions point of view, thus making it unsuitable for a hostile environment like battlefield applications, since a base station can be easily detected and targeted with homing weapons. In civilian applications, regulations allocating frequency bands and physical spacing between transmitters minimize the requirements for countermeasures. This is not the case with battlefield applications, where the system has to work reliably, particularly in the presence of intentional (hostile) interference.

Wireless LANs which operate in Time Division Multiple Access (TDMA) systems, e.g. Digital European Cordless Telephone (DECT), also have the base station problem mentioned above. LANs which rely on carrier sense multiple access with collision avoidance (CSMA/CA), given the small Processing Gain (PG) of less than 11 dB, can operate in a limited peer-to-peer mode; however, such LANs have no means to combat call collisions even with a relatively small number of users (e.g., five or six). None of these systems has any means to account for network members coming in and out of direct line of sight range. Wireless LANs working in CSMA/CA mode rely on access points to handle increased numbers of users. An access point fulfills the same role as a base station.

Given the number and complexity of parameters which have to be varied and/or adapted to the environment, any attempt to control classical communications parameters without a systematic way of combining and selecting which parameters to change, dooms any system to poor performance and to be plagued by reliability problems. This is, indeed, very noticeable in current Cellular and Personal Communications System, where communications cannot be maintained in a reliable fashion.

SUMMARY OF THE INVENTION

Therefore, in light of the above, and for other reasons that become apparent when the invention is fully described, an object of the present invention is to coordinate selection of parameters used to communicate between network nodes on a message-by-message basis.

A further object of the present invention is to maintain reliable network communications using a minimum of RF resources, such as transmit power.

Yet a further object of the present invention is to reduce or eliminate the need for centralized control of network message routing and parameters used to transmit and receive messages between network nodes.

A still further object of the present invention is to communicate among nodes of a network on a peer-to-peer basis.

Another object of the present invention is to reduce susceptibility to intentional or unintentional interference.

Yet another object of the present invention is to account for rapidly changing topologies in a network of mobile communication nodes, including node movement and nodes entering and leaving the network, by dynamically adjusting the routing of messages between nodes.

Still another object of the present invention is to provide an adaptive self-healing, self-configuring network capable of establishing and maintaining control of peer-to-peer communications and message routing at the node level.

It is a further object of the present invention to adaptively change parameters used to transmit messages to account for time-varying multipath, interference and signal reception conditions.

It is yet a further object of the present invention to distribute audio, video and data information in a mobile, wireless network.

It is another object of the present invention to maximize use of a network's communication media by employing both frequency division and coded division of the available RF spectrum.

It is yet another object of the present invention to employ principles from general system theory to organize and coordinate selection of multiple signal transmission parameters.

The aforesaid objects are achieved individually and in combination, and it is not intended that the present invention be construed as requiring two or more of the objects to be combined unless expressly required by the claims attached hereto.

In accordance with the present invention, operational parameters are selected for transmitting a signal (e.g., a message packet) over a communication channel of a network by first determining RF conditions on the communication channel from a received signal that has been transmitted over the communication channel. Based on the observed RF conditions, an initial set of parameter values is selected for transmitting the next signal over the communication channel. The analysis of RF conditions includes, for example, an estimate of the received signal power and signal-to-noise ratio; a spectral analysis to identify frequencies experiencing severe interference; and an estimate of the multipath profile. The parameters to be set may include, for example, data rate and type, packet length, signal bandwidth, the frequency and code channels (if using FDMA and CDMA), the transmitted power, the multipath profile and the forward error correction scheme. Each one of these parameters can take on a value within a set of discrete values (e.g., each parameter may have eight possible values). The initial set of parameters is selected to maximize, under current channel conditions, such performance metrics as probability of acquisition and packet reliability, while minimizing the RF resources required to transmit the signal (reflected in parameters such as the transmitted power, bandwidth, data rate, etc.).

While the initial set of parameters can be expected to provide adequate performance in terms of these performance metrics, it is possible that, by modifying one or more of the parameters to some degree, even better performance would result. This is because the process of initially selecting the parameter values does not necessarily take into consideration how well the entire set of parameters will work together (although the selection of certain subsets of the parameters may have been interrelated). For example, it may be the case with a certain set of parameter values that slightly increasing the data rate provides significant benefits with relatively little loss (or an acceptable loss) of performance.

In view of the fact that adjusting certain parameter values may potentially provide better performance, the initial set of parameter values is used to identify other sets of parameter values as potential candidates for transmitting the signal. The parameter values in these other sets of parameter values differ from the parameter values in the initial set of parameter values by less than some predetermined amount. In other words, the potential candidate sets of parameter values are restricted to those parameter sets whose values deviate from those of the initial parameter set by some limited degree.

The expected relative performance of each set of parameters can be computed from well-known principles of physics, signal theory and the operational specifications of the hardware involved. In accordance with an exemplary embodiment of the present invention, the expected relative performance of each possible set of parameter values is computed in advance and represented as a "weight" value. The weight of every possible parameter value combination is then stored in an N-dimensional look-up table that is indexed by the N parameter values. The initial set of parameter values is then used to conduct a search of a portion of the N-dimensional table for the highest weighted (best) combination of parameter values. Specifically, only those parameter value sets in the N-dimensional "neighborhood" of the initial set of parameter values is considered. This neighborhood is defined by some amount of acceptable deviation in each parameter value. For example, the search may be limited to sets of parameter values where the value of each parameter is within a one value increase or decrease of the corresponding parameter in the initially selected set.

Once the candidate sets of parameter values are identified, their relative expected performance weights are compared to find the set of parameter values having the best expected performance among the candidate sets. The selected set of parameter values is then used to transmit the signal on the communication channel. By this technique, the set of parameter values is selected in a coordinated manner that takes into account the performance of the parameter values as a complete set, rather than individually.

To formalize the mechanization of the present invention, the set of parameters can be organized into a system state vector whose coordinates represent the different parameters. The process of selecting the set of parameter values to transmit the next message can then be performed by applying a system state transformation to the system state vector, which in effect updates the system state vector from a previous state (used to transmit the previous message on the channel) to a new state (i.e., the parameter values found to provide the best expected performance).

The parameter value selection technique of the present invention is applied on a message-by-message basis. In accordance with a preferred embodiment, the network is a multimedia mobile communication system comprising mobile nodes capable of transmitting audio, video and data information. Each node communicates with other nodes on a peer-to-peer basis and maintains and updates a separate system state vector of parameters for each node with which it is directly communicating. By controlling communication parameters at each node, the need for a base station providing centralized control is eliminated. The network is self-configuring and self-healing, with each node maintaining a message routing table developed by periodically transmitting neighbor discovery messages that establish which nodes are within the line of sight of each node.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

In accordance with the present invention, nodes within a network reliably and efficiently transmit and receive information by dynamically coordinating selection of multiple transmission parameters as a function of operational requirements and the present environment affecting the condition of the communication medium. As used herein, the term "node" refers to a communication device operating in a network of communication devices. The node may be a mobile communication device, such as a radio, wireless telephone, or multimedia terminal capable of transmitting and receiving audio, video and data information. Alternatively, the node may be stationary or fixed in a particular location. As used herein, the term "channel" refers to a communication path between nodes, and different channels can exist on separate communication media or on a common communication medium, with individual channels being separated by any suitable means, such as any combination of time, frequency, or encoding.

Nodes communicate with each other by exchanging messages over communication channels. Each message is transmitted using a particular set of parameters. By way of non-limiting example, a node may set (or have as a default) one or more of the following transmission parameters: the data rate, the packet length, the signal bandwidth, the frequency channel, the code channel (if using code division multiple access), the transmit signal power and the forward error correction scheme. Further the message may convey observations about the multipath profile or specify the number of equalizer branches to be used in receiving a message. Each time a node receives a message, the node may learn information about the surrounding environment, the condition of the communication channel or particular requirements for transmitting subsequent messages.

Conventionally, such information has been used to independently or individually adjust operational parameters, such as those mentioned above. For example, if it is determined that interference on a particular frequency channel is excessive, the node (or user of the node) may elect to alter one or some of the operational parameters to compensate for or avoid the interference (e.g., change the frequency or increase the transmit signal power). Unfortunately, optimization a of few parameters independently with no consideration of other parameters or factors which affect the system performance can, and in most cases does, degrade the communication system performance and reliability, achieving exactly the opposite of the intended goal. The correct and reliable functioning of a communications system, particularly a multimedia communications system operating in a mobile environment with restricted terrains, requires a systematic way of managing communications parameters.

The present invention presents a structured, coordinated approach for selecting sets of operational parameters resulting in efficient and reliable message exchanges between network nodes. Concepts derived from general system theory are applied to organize, control and optimize the specific parameters of a communication system and its subsystems. More particularly, a System State Vector (SSV) is constructed from the set of communications parameters used to transmit each message. Thus, for example, the System State Vector may specify the data rate, the packet length, the signal bandwidth, the frequency channel, the code channel, the transmit signal power, the multipath profile and the forward error correction scheme used to transmit a message from one node to another node.

Each node maintains a System State Vector for every node with which it is directly communicating. With each message, the receiving node learns information about the communication channel, such as the channel multipath characteristics and interference levels. A System State Transformation (SST) relies on this channel information as well as pre-stored information to update the System State Vector, which is then used to transmit the next message on that channel. The process of updating the System State Vector with the System State Transformation involves considering the expected performance that would result with many different possible combinations of communication parameters (SSVs) under the present channel conditions. Importantly, this approach allows the expected performance to be assessed from the standpoint of the complete set of communication parameters in concert, rather than focusing on one or a few parameters without considering whether these few parameters will operate well with the remaining parameters.

The following exemplary embodiment of the present invention reveals the methods and apparatus of the present invention in detail. In the exemplary embodiment, the communication system is a Mobile Multimedia Communications System (MMCS) composed of a network of nodes. The nodes are mobile multimedia terminals capable of transmitting and receiving waveforms through a Radio Frequency RF medium containing audio (e.g., voice), motion video and data information. The mobile network may be required to handle rapidly changing topologies and to work in restricted and possibly hostile environments. Communications between nodes are performed using relatively short bursts, which contain both control and user information.

Figure 1:
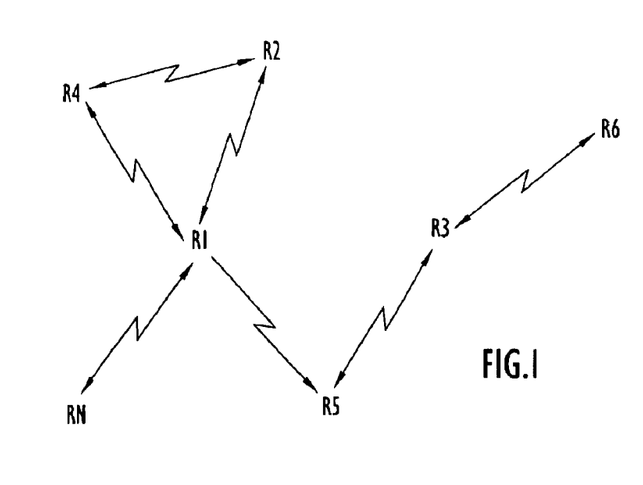
FIG. 1 is a network topology diagram illustrating the Neighbor Discovery process, wherein each node in the network sends a message to its neighbors within Line of Sight range in accordance with an exemplary embodiment of the present invention.

Referring to FIG. 1, the system is initialized by conducting a neighbor discovery inquiry in which each node broadcasts neighbor discovery messages that can be received by all the nodes in direct line of sight (LoS) of the broadcasting node. By transmitting these neighbor discovery messages and receiving reply messages, each node is alerted to the presence of neighbors which are in its line of sight. For example, in FIG. 1, node $R_1$ broadcasts a neighbor discovery message that is received by nodes $R_2$, $R_4$, $R_5$, and $R_N$. Likewise, node $R_1$ receives neighbor discovery messages from each of these nodes in reply.

Figure 2:
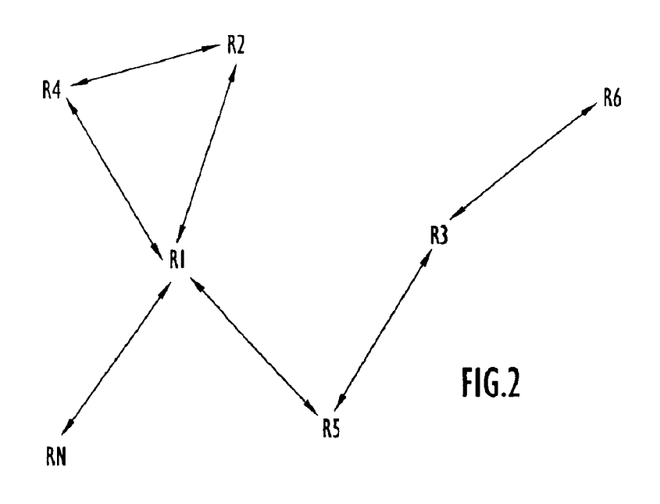
FIG. 2 illustrates message routing through several network nodes reflected in routing tables generated based on information from the neighbor discovery process.

Upon receiving the neighbor discovery messages, the nodes build routing tables which identify the network connectivity and establish the message paths, direct or indirect, between any two nodes in the network. Referring to FIG. 2, after exchanging the neighbor discovery messages, it is established that node $R_1$ can communicate directly with nodes $R_2$, $R_4$, $R_5$ and $R_N$, while node $R_2$ can communicate directly with nodes $R_1$ and $R_4$, and node $R_3$ can communicate directly with nodes $R_5$ and $R_6$. Message routing between every pair of nodes is then determined. For example, to communicate between nodes $R_2$ and $R_6$, the message route may traverse the following nodes: $R_2$, $R_1$, $R_5$, $R_3$, $R_6$. Since nodes $R_1$ and $R_2$ are within line of sight of each other, the direct message route between these nodes involves only the two nodes themselves: $R_2$, $R_1$. A second, indirect route between nodes $R_1$ and $R_2$ can be establish through node $R_4$ (i.e., Route 2: $R_2$, $R_4$, $R_1$), since both node $R_1$ and node $R_2$ can communicate directly with node $R_4$. This alternate route can be used if the direct path between nodes $R_1$ and $R_2$ become degraded or unavailable (e.g., due to an intervening obstacle). As will be appreciated from FIG. 2, the nodes of the network communicate in a peer-to-peer manner without use of an intervening base station, wherein nodes rely messages through peer nodes to communicate with nodes that are not within the line of sight.

The routing tables which specify the message route between every pair of nodes needs to be updated from time to time to account for changes in the network. For example, since the nodes are mobile, information about which nodes are within line of sight of each other may only be accurate for a short period of time. Further, nodes may leave the network at any time, and new nodes may enter the network at any time. Consequently, updating of the routing tables requires the nodes to broadcast neighbor discovery messages at specified time intervals. The broadcast neighbor discovery messages must be sent at a frequency (interval of time) that is faster than the network dynamics, so that the routing tables can be updated often enough to keep up with changing network conditions. The interval of time between updates can be set to the time required for a node moving in a radially outward direction to leave the line of sight of at least one node. Thus, for example, depending on the nature of the network, it may be necessary to broadcast the neighbor discover messages and update the routing tables every thirty seconds or at five minute intervals. In the case of a military battlefield operation, given that any node could literally leave the network instantaneously when hit by hostile fire, network dynamics could be much faster than that dictated by the criterion of movement causing loss of LoS, and even more frequent updates may be warranted.

The neighbor discovery process can be used to distribute other information to the nodes of the network. For example, the broadcast messages may send the Time of Day clock to all the neighbors such that the entire system is synchronized according to relative Time of Day, which was entered into at least one node during system startup. As explained in greater detail hereinbelow, in accordance with the present invention, each of these neighbor discovery messages also includes a State System Vector (SSV) containing information on the current, or initial, state of the communication parameters used to transmit the message.

Figure 3:
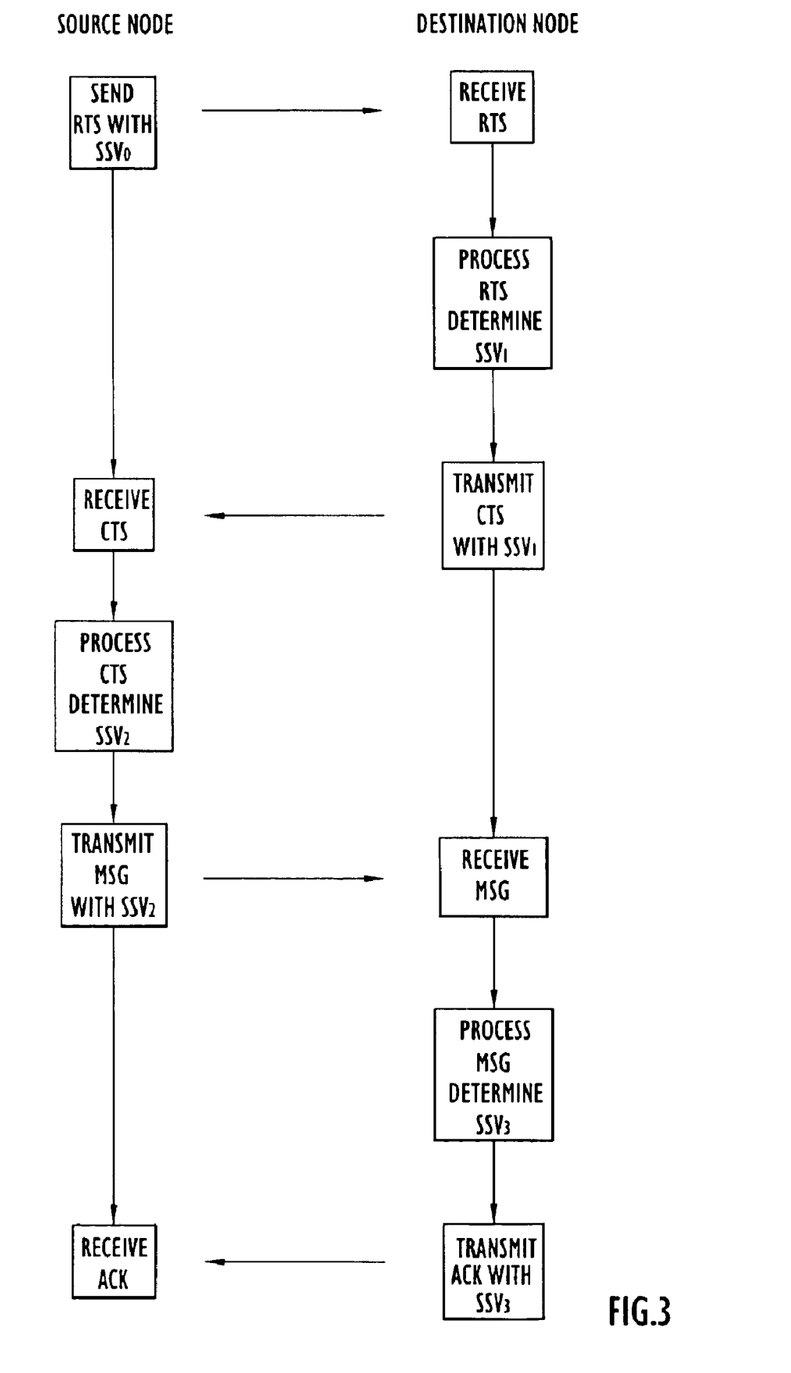
FIG. 3 is a functional flow diagram of the sequence of messages exchanges that occur between a source and destination node when transferring audio, video or data between the nodes.

Other than broadcast messages, the exchange of messages in the exemplary network follows a protocol of sending short bursts containing control information, followed by transfer of the information message and a final acknowledge message in reply. The sequence of messages involved in a typical exchange is shown in FIG. 3. A source node (transmitter) sends an initial Request-to-Send (RTS) message to a destination node (receiver) requesting channel access to send an information message. The destination node receives the RTS message and replies to the source node with a Clear-to-Send (CTS) message authorizing transmission of the information message. Upon receiving the CTS message, the source node transmits the information message (MSG), which may contain audio, video or data information. If the destination node successfully receives the information message, the destination node replies to the source node with a final acknowledge (ACK) message.

Both the short-burst control messages (RTS, CTS and ACK) as well as the information message (MSG) are transmitted with a particular System State Vector (SSV) that is updated with each transmission between the two nodes. Specifically, the source node sends the initial RTS message with it its own System State Vector ($SSV_0$). The initial $SSV_0$ is a default vector which is initialized into the system for every node. Based on channel characteristics the destination node observes from the RTS message and from pre-stored information about the relative performance of different combinations of parameters (different SSV values), the destination node applies the System State Transformation to $SSV_0$ to obtain an updated system state vector $SSV_1$. The destination node then transmits the CTS back to the source node using the parameters of $SSV_1$.

Upon receiving the CTS message containing the destination node $SSV_1$, the source node applies the System State Transformation to $SSV_1$ to obtain an updated system state vector $SSV_2$ based on channel characteristics the source node observes from the CTS message and from pre-stored information about the relative performance of different combinations of parameters. The updated $SSV_2$ is then applied by the source node to the information message (MSG) transmission.

The destination node receives the information message (MSG), updates the SSV to obtain $SSV_3$ and sends an Acknowledge message (ACK) to the source node, which contains the $SSV_3$ that was obtained by the destination node, showing the actual parameters that were received, e.g., an estimate of the Received Signal Level, as well as the channel multipath and spectrum characteristics (i.e., the ACK contains the final SSV which represents the state of the destination node after the MSG transmission).

Figure 4:
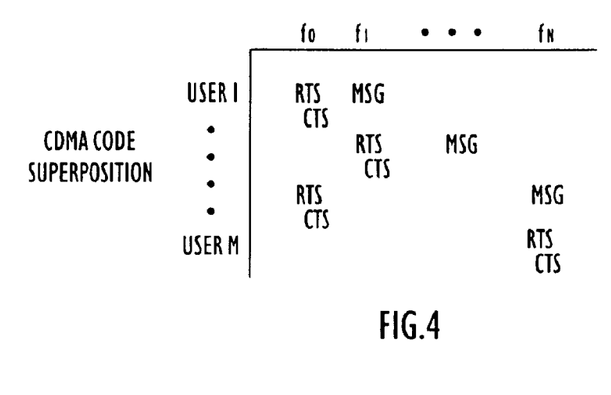
FIG. 4 is a chart illustrating the use of both code division multiple access (CDMA) and frequency division multiple access (FDMA), where a multiplicity of users share the same time-bandwidth, separated by code and frequency channels.

The nodes of the exemplary embodiment preferably transmit and receive control and user information messages with a Code Division Multiple Access (CDMA) waveform, using a Carrier Sense Multiple Access with collision avoidance (CSMA/CA). Using Direct Sequence Spread Spectrum (DSSS) signaling, multiple messages can be sent over the same time-frequency channel and they will be separated at the receiver by the code which identifies the specific user channel. To take full advantage of the code division, the available RF spectrum can be divided into multiple frequency channels, such that multiple frequency channels exist for every CDMA code. FIG. 4 illustrates the advantages of this feature. At any point in time, each user (node) employs a particular CDMA code for communicating RTS, CTS, MSG and ACK messages. However, the burst RTS and CTS messages can be transmitted on a different frequency than the information message (MSG), as suggested by FIG. 4. By equipping each node with two receivers, each node can simultaneously "listen for" and receive RTS/CTS message traffic on one frequency channel while receiving or transmitting an information message on a separate frequency channel. By defining communication channels using both CDMA and FDMA and by employing plural receivers, any number of channel/receiver allocation schemes can realize highly efficient use of RF resources among a group of nodes, such as the schemes described in U.S. patent application Ser. No. 09/705,588 entitled "Methods and Apparatus for Coordinating Channel Access to Shared Parallel Data Channels," filed Nov. 3, 2000, now U.S. Pat. No. 6,404,756, the disclosure of which is incorporated herein by reference in its entirety.

Whether transmitting and receiving broadcast neighbor discovery messages or exchanging control or information messages, each node transmits each message using a particular set of communication parameters. In accordance with the exemplary embodiment, the communication parameters include: the data rate and type, the packet length, the signal bandwidth, the frequency channel, the code channel, the transmitted power, the multipath profile and the forward error correction scheme. It will be understood the present invention is not limited to this particular set of communications parameters, and the present invention can be applied to virtually any set of parameters suitable for adequately controlling transmission of messages in a given communication system scheme.

In accordance with the present invention, the communications parameters are organized into a System State Vector (SSV). Since every channel between every pair of nodes has individual operational requirements and experiences unique multipath and interference characteristics, each node maintains a distinct System State Vector for each neighboring node with which it is directly communicating (i.e., all of the node's LoS neighbors).

Essentially, for each message, the node attempts to provide the best possible performance by maximizing the rate at which information is conveyed, the probability of acquisition (a function of the probability of detection) and the packet reliability (a function of the bit error rate), while minimizing the probability of false alarm at the receiver and the amount of resources required for transmission (e.g., transmit power and bandwidth). In order to achieve these goals, the various communications parameters must be dynamically varied in a coordinated manner, taking into account time-varying channel characteristics and the inherent statistical performance expected by certain combinations of parameters. For each node-to-node communication, information such as the received signal level and the channel multipath and interference characteristics will drive selection of parameters such as the frequency and code channel, the packet length, the data rate, and the transmit power.

A principal concept of the present invention is the use of a System State Transformation (SST) to control changes in the state of the communications parameters represented by the System State Vector (SSV). The System State Transformation (SST) is a non-linear transformation that operates on the SSV parameters to obtain a new SSV which is adapted not only to the current environment conditions, but also to the type of transmission which occurs between the specific nodes communicating at any given time, e.g., audio, video, data or full multimedia (synchronized voice, data and motion video) information.

The SSVs are, in fact, vectors in a multidimensional Hilbert Space (a space where the elements are sets instead of numbers) which in turn is mapped to a Vector Space (a space where the elements are real numbers). The coordinates in the Hilbert Space are sets of values, while the final coordinates are specific numeric values in a classical Vector Space.

For example, each message is transmitted using a particular frequency channel and a particular code channel. Each node in the system may be capable of transmitting within three separate frequency bands (e.g., 225–450 MHZ, 800–1000 MHZ and 1700–1900 MHZ). Within each of these bands, are a several individual frequency channels separated by 50 MHZ. The Hilbert coordinates of the frequency channels are the three frequency bands (range of frequencies), while the Vector coordinates are the specific frequencies within the bands. Similarly, for the pseudo noise (pn) spreading codes of the code channels, the Hilbert coordinates are generating functions (initial states or "seeds" for an $R^N$ sequence generator), while the Vector coordinates are the generated sequences themselves. Thus, the Hilbert coordinates of the SSV can be represented as follows:

Frequency Bands $F_B$: $[B_1 \ldots B_N]$ MHZ
Code Sequence $C_S$: $[S_1 \ldots S_N]$ seeds for an $R^N$ sequence generator The Vector coordinates for a representative SSV can be:

| | | |
|---|---|---|
| Date Rate/Type | $Dr_i$: | [8, 16, 32, 64, 128, 256, 512, 1024] Kbps/Voice, Data, Video |
| Packet Length | $Pkt_i$: | [16, 32, 64, 128, 256, 512, 1024, 2048] Bytes |
| Signal Bandwidth | $Bw_i$: | [0.5, 1, 2, 4, 8, 16, 32] MHZ |
| Frequency Channel | $Fc_i$: | [825, 850, 875, 900, 925, 950, 975, 1000] MHZ |
| Code Channel | $Cs_i$: | $[S_1 \ldots S_8]$ Subsequence of a selected sequence $S_i$ |
| Transmitted Power | $Pt_i$: | [0, 4, 8, 12, 16, 20, 24, 30] dBm |
| Multipath Profile | $Mp_i$: | [1, 2, 3, 4, 5, 6, 7, 8] Equalizer Branches |
| Forward Error Correction | $FEC_i$: | [½ Rate, ¾ Rate] Convolutional Code (K = 7) |

Note that each of the vector coordinates (i.e., parameters) can take on any one of a predefined set of values. For example, the date rate is permitted to be one of the following rates: 8, 16, 32, 64, 128, 256, 512 or 1024 Kbps. The values are arranged in a particular order (in this case increasing), such that adjacent values represent incremental changes in the parameter.

A General System Transformation is usually represented by a matrix applied to a column vector which yields a new vector. In general, an N by N matrix M can be applied (with the conventional matrix multiplication definition) to a column vector X of N elements to yield a new column vector Y, the elements of which are linear combinations of the elements of X.

$$X = \begin{bmatrix} SSV_{in} \\ X_1 \\ \vdots \\ X_N \end{bmatrix} \quad Y = \begin{bmatrix} SSV_{out} \\ Y_1 \\ \vdots \\ Y_N \end{bmatrix}$$

In particular cases, the transformation applied is non-linear, e.g., the elements of M are sin(x) and cos(x), where the resulting vector is a rotation of the input vector. There are, in fact, infinite classes of system transformations which have been applied to large varieties of problems, from feedback control to transportation problems.

Drawing from this background, the present invention introduces non-linear functions, represented by line vector (alphas) which operate on each one of the coordinates of the SSV.

$$A = [\alpha_1 \ldots \alpha_N]$$

Each function is defined with respect to these coordinates. Observe that a function is a mapping f: [C ->D], from the elements of set C to the elements of set D. In the conventional case, sin(x) is a mapping between the real numbers C=>D=|x|≦2π. This function can be specified in terms of a mathematical transformation (combination of sums, differences, multiplication, etc.) or by a table of correspondences. In accordance with the exemplary embodiment of the present invention, the System State Transformation is defined in terms of a table of correspondences or State Transition Mapping (STM) to map the input SSV to an output SSV, or:

$$AX = [\alpha_1(X_1), \alpha_2(X_2), \ldots, \alpha_N(X_N)] = Y^T$$

where $$Y_1 = \alpha_1(X_1)$$
$$\vdots \quad \vdots$$
$$Y_N = \alpha_N(X_N)$$

Each one of the $\alpha_1$ functions is a two step function which operates first on the Hilbert coordinates (i.e., sets) and second on the vector coordinates. Thus, returning to the aforementioned example, the SSV contains a frequency band of 800–1000 MHZ, and channel frequencies separated by 50 MHZ inside this band. The Hilbert coordinates of the frequency channels are the bands 225–450 MHZ, 800–1000 MHZ and 1700–1900 MHZ. The first step of the α function selects the 225–450 MHZ band (a Hilbert or set coordinate), and the second step will select $f_c$=300 MHZ within this band (a Vector coordinate). The criteria for this selection could be, for example, switching from a civilian operating band to a military operating band at the start of hostilities.

Taking another example, an alpha function $\alpha_1$ operates on the input data rate $Dr_{in}=X_1$ to produce an output data rate $Dr_{out}=Y_1$. The output data rate selected will depend on factors such as the type of information (voice, video or data), the signal bandwidth and/or the multipath dispersion. The combination of all $\alpha_1$ functions applied to the respective $SSV_{in}$ coordinates will yield a new $SSV_{out}$, which is formed by specific coordinates (i.e., specific values for the communication parameters).

Figure 5:
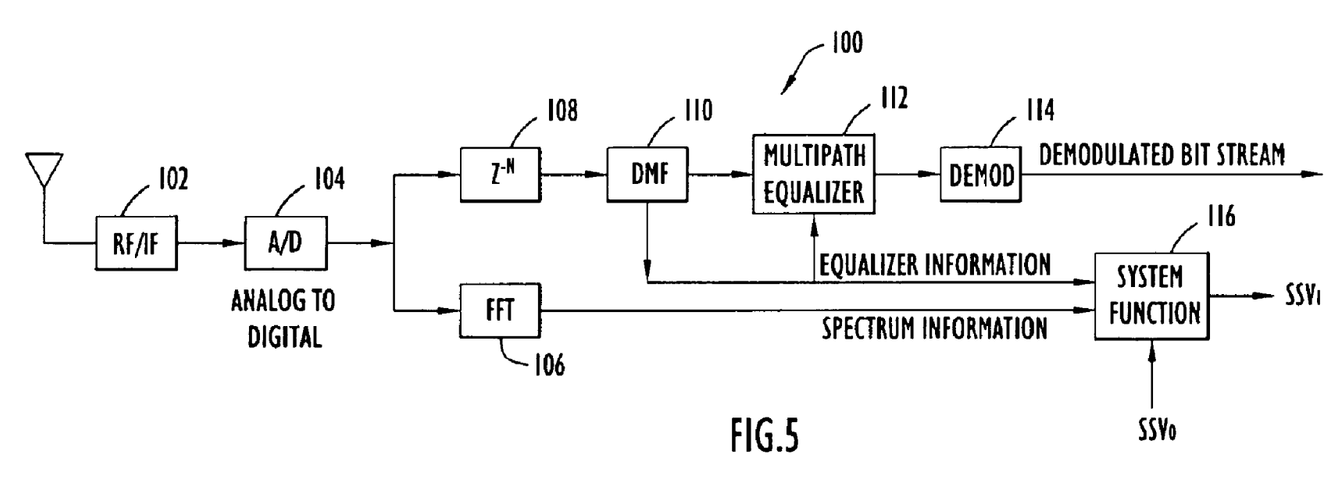
FIG. 5 is a functional block diagram of a receiver generating multipath and spectrum information for use in the system state transformation in accordance with the present invention.
Figure 6A:
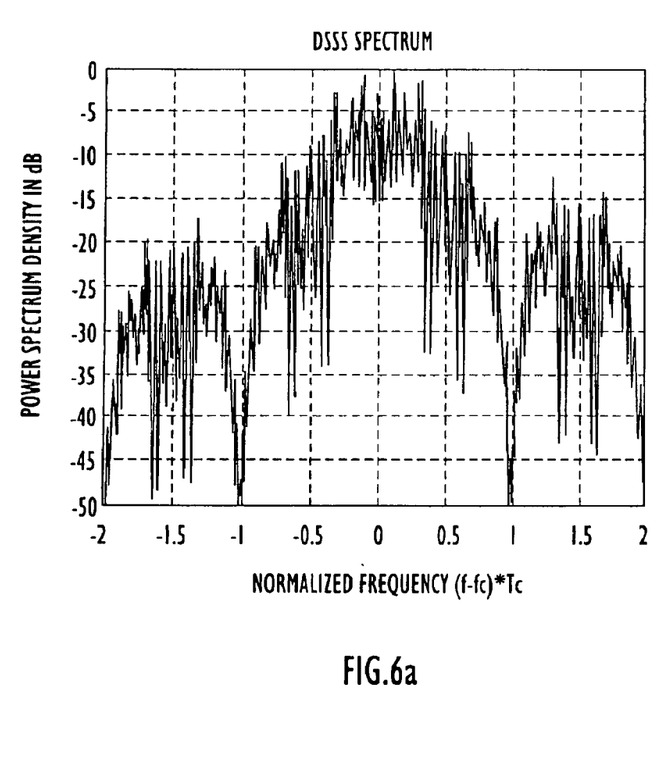
FIGS. 6a and 6b are graphical representations of the power spectrum density of a received direct sequence spread spectrum (DSSS) signal with and without interferers, respectively.
Figure 6B:
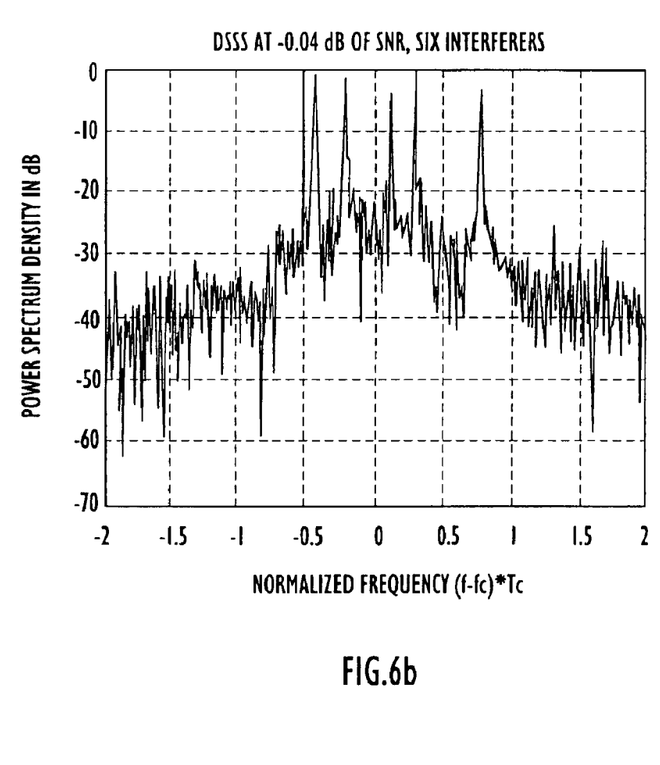

In updating the SSV, the SST relies on both information obtained through the exchange of SSVs between transmitter and receiver and on information pre-stored in the node, which relates given levels of performance for each combination of parameters. With regard to information obtained via messages exchanges, upon receiving a message, the receiver performs a "channel probe" and a "spectrum survey" of the received message signal. The receiver also determines the estimated received signal power from which the receiver can estimate the received signal-to-noise ratio (SNR) and an approximate bit error rate (BER) for the SNR. The channel probe involves determination of the channel multipath characteristics by analyzing the reception of a known bit pattern. The spectrum survey is a determination of the spectral content (i.e., the background noise and interference levels) by means of a frequency domain transform of the received signal. Referring to FIG. 5, a receiver 100 includes a mixer 102 or similar device that mixes the received RF signal down to an intermediate frequency (IF). The IF signal is then converted to a digital signal by an analog-to-digital converter 104. A Fast Fourier Transform (FFT 106) is performed on the digital signal to provide the spectral content of the signal. An example of the power spectral density profiles of a direct sequence spread spectrum (DSSS) signal with no interferers and six interferers are respectively shown in FIGS. 6a and 6b. The spectrum survey essentially indicates what frequencies are experiencing significant interference, whether intentional (e.g., jamming) or unintentional.

Figure 7:
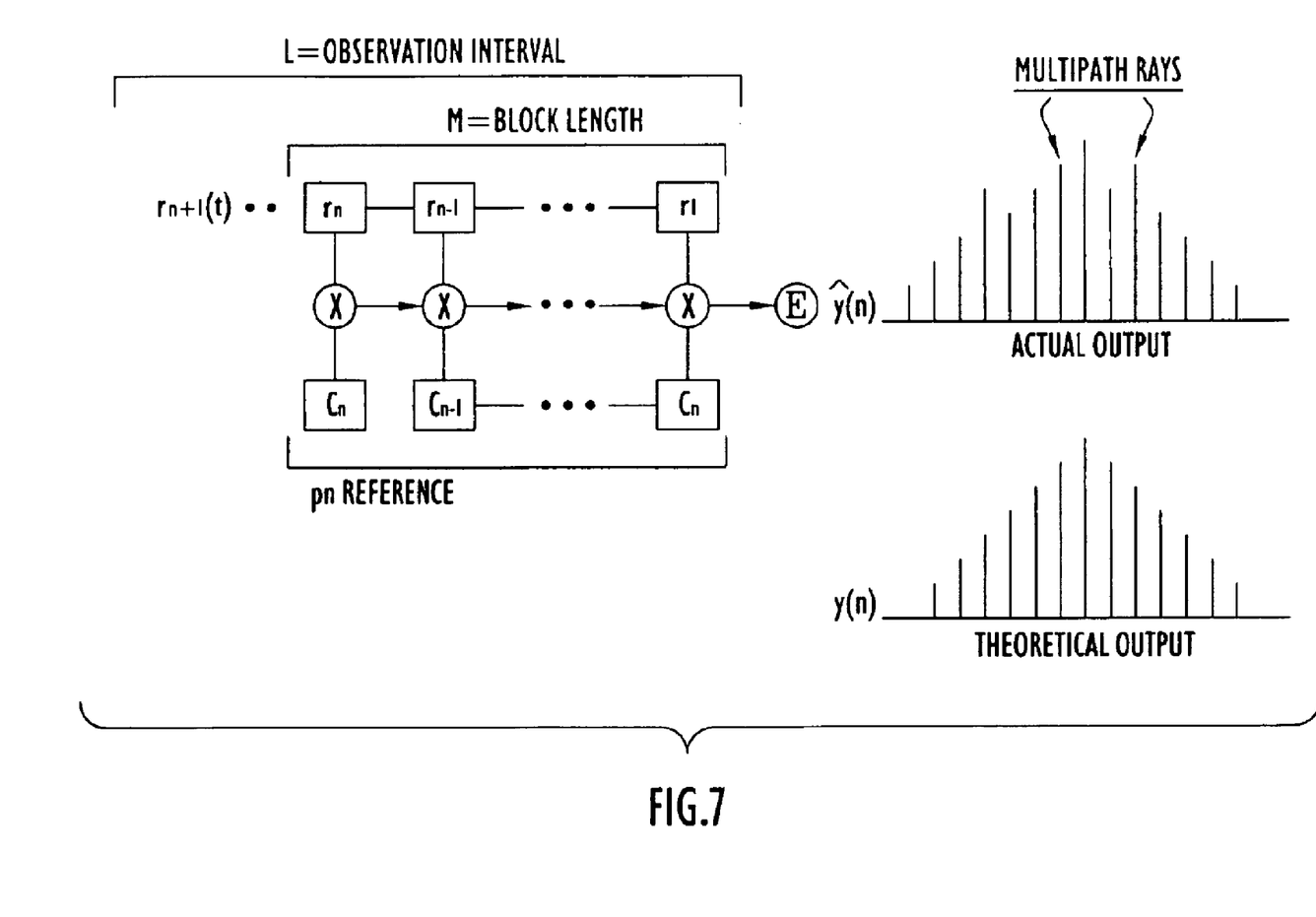
FIG. 7 illustrates use of a digital matched filter to estimate the multipath profile from a received known bit pattern.

The digital IF signal is also supplied to a digital matched filter 110. Included in the received message is a known bit pattern. By analyzing the matched filter output of this known bit pattern, the channel multipath characteristic are reveal. Referring to FIG. 7, the known bit pattern will produce a theoretical output y(n) in the absence of multipath distortions and interference. Deviations in the actual matched filter output result from multipath signals. Specifically, the actual matched filter output ŷ(n) is given by:

$$\hat{y}(n) = \sum_{i=0}^{L-1} \sum_{j=0}^{M-1} c_j r(n - jL - i)$$

where M is the block length, L is the observation interval, $c_j$ are the stored pn reference bit pattern samples and $r_i$ are the received digital samples. By comparing the actual output ŷ(n) with the theoretical output y(n), the multipath profile can be determined.

Referring again to FIG. 5, the channel multipath information (equalizer information) is supplied to a multipath equalizer 112, which can be a rake filter designed to constructively add the various multipath signals, and is used to apply weights to the branches (taps) of the equalizer. The equalizer information is used to set the number of signal branches to be used in the equalizer. The equalizer output is then received by a demodulator 114 to produce a demodulated bit stream that is further processed by the receiving node to determine the contents of the received message.

The channel probe (equalizer) information produced by digital matched filter 110 as well as the spectrum information generated by the FFT 106 serve as inputs to the System State Transformation Function 116 which converts an input $SSV_{in}$ to an output $SSV_{out}$. A delay 108 is applied to the digital IF signal prior to the digital matched filter 110 in order to synchronize the spectrum information generated by the FFT 106 and the equalizer information provide by the digital matched filter 110. The system state transformation then employs this information about the channel characteristics in selecting a new system state vector.

The system state transition is aimed at maximizing the received Energy per Symbol (Es/No) for both signal acquisition and reliable reception of the information as well as maximizing the information message (MSG) reliability. Thus, the goal of the system state transition is to find, within certain constraints, a particular combination of parameters (SSV values) that are expected to provide the best performance in terms of these metrics. As will be apparent to those skilled in the art, the expected statistical performance of any set of parameters in terms of relative received Energy per Symbol (Es/No), probability of detection and false alarm, and packet reliability, can be computed based on fundamental principals of physics and signal theory, the particular waveforms being used, and knowledge of hardware specifications and capabilities of the particular system involved. By computing the statistically expected relative performance of each possible combination of parameters, this information can be quantified and represented as a relative performance "weight" assigned to each combination. These weights, which are numerical values, are employed by the System State Transformation Selection Criteria to choose a specific SSV over all other alternatives.

Assuming, for example, that the System State Vector includes eight parameters (e.g., data rate, packet length, signal bandwidth, frequency channel, code channel, transmitted power, multipath profile and forward error correction (FEC)), and further assuming that each of the eight parameters can take on eight values (e.g., those listed above with the exception of the FEC), there would be $8^8$ different possible SSV values (i.e., over sixteen million different possible combinations of parameters with which a message can be transmitted). The performance weight of each of these sixteen million possible SSVs can be computed in advance, and the pre-computed weights can then be loaded into each node in an eight-dimensional table that is indexed by the eight states of the SSV (i.e., the values of the eight parameters). Thus, each one of the possible combinations of all SSV coordinates will have a corresponding weight vector, which can be represented by a binary word containing the relative weight value of the SSV. Storage of this amount of information is certainly within the capability of current hardware. Further, all or part of the function definition correspondence (i.e. the table) can be dynamically replaced since they are stored numbers in a computer memory.

The combination of the pre-computed weight values with real-time information derived from the exchange of SSVs in the Neighbor Discovery process and information messages exchanges (e.g., the SNR estimate, the Channel Probe and the Spectrum Survey) is then used to generate a new SSV which will be used in the next message transmission. This process is repeated for every exchange of information between two nodes. Observe that, regardless of the length of the applications message, e.g. voice or multimedia transmission, at the RF level information is always exchanged in relatively short packet bursts.

Figure 8:
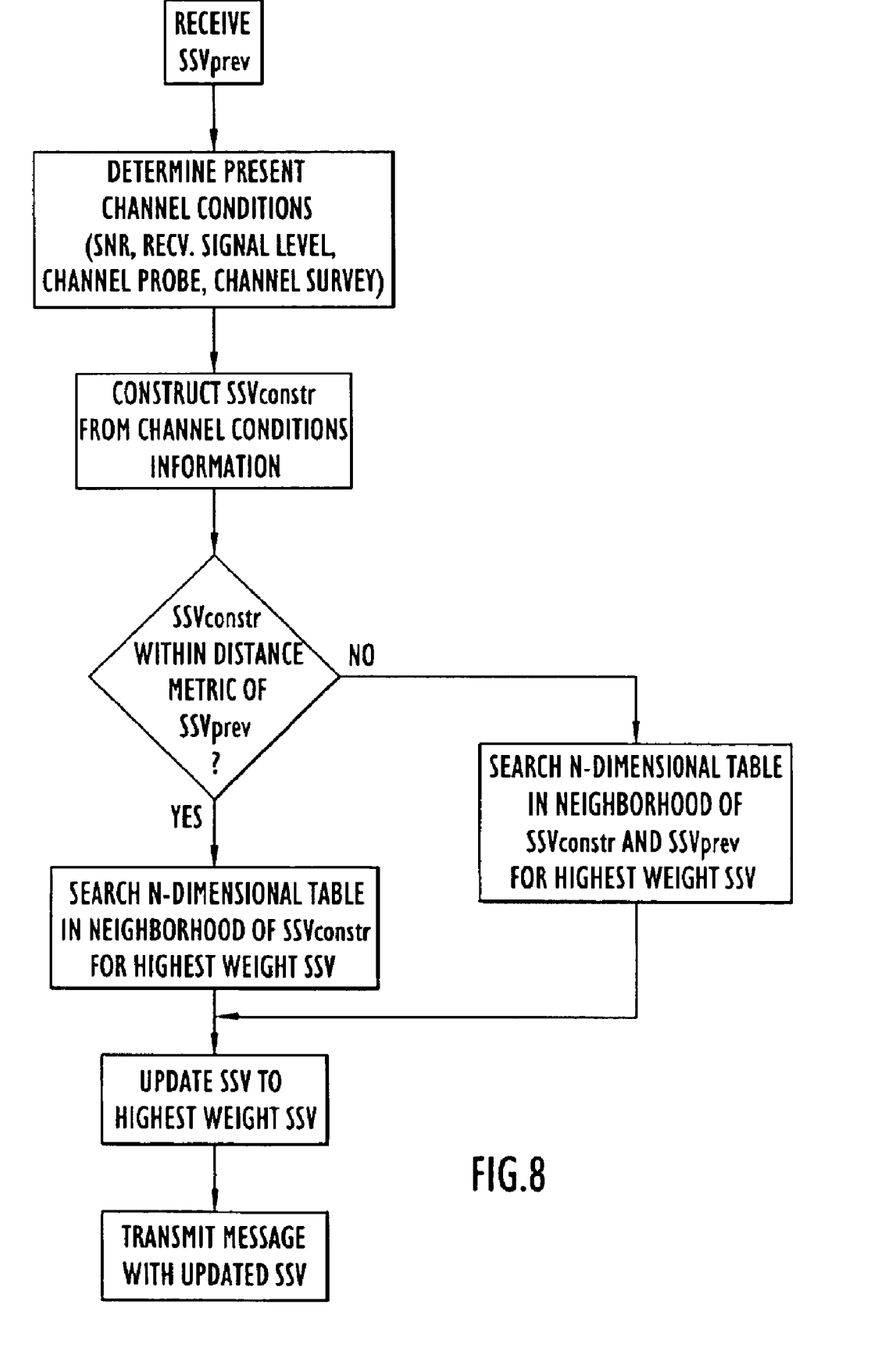
FIG. 8 is a functional flow diagram illustrating the system state transformation process of updating the system state vector.

The system state transition processing is illustrated in FIG. 8. Each broadcast neighbor discovery message and each control and information message is transmitted using a particular SSV. Upon receiving a message, the receiving node identifies the previous SSV used on the channel ($SSV_{prev}$). Further, the node determines the present condition of the channel on which the message was received, including estimating the received signal power, estimating the signal-to-noise ratio, determining the approximate bit error rate, and performing the channel probe and the spectrum survey analyses. Based on specific operational constraints and requirements as well as the channel conditions such as the estimated received signal power, the estimated received SNR and approximate BER, the interference level determined from the spectrum survey, and the multipath characteristics determined from the channel probe, the receiving node will construct another SSV ($SSV_{constr}$). For example, the node may select a particular data rate as a function of the type of data being transmitted; the frequency and code channels may be selected in response to the observed interference levels; the multipath profile (number of equalizer branches) and FEC may be selected as a function of the observed multipath characteristics; the transmit power and packet length may be selected as a function of the received signal power, BER and corresponding packet reliability. In this manner, the node constructs the $SSV_{constr}$.

Figure 9:
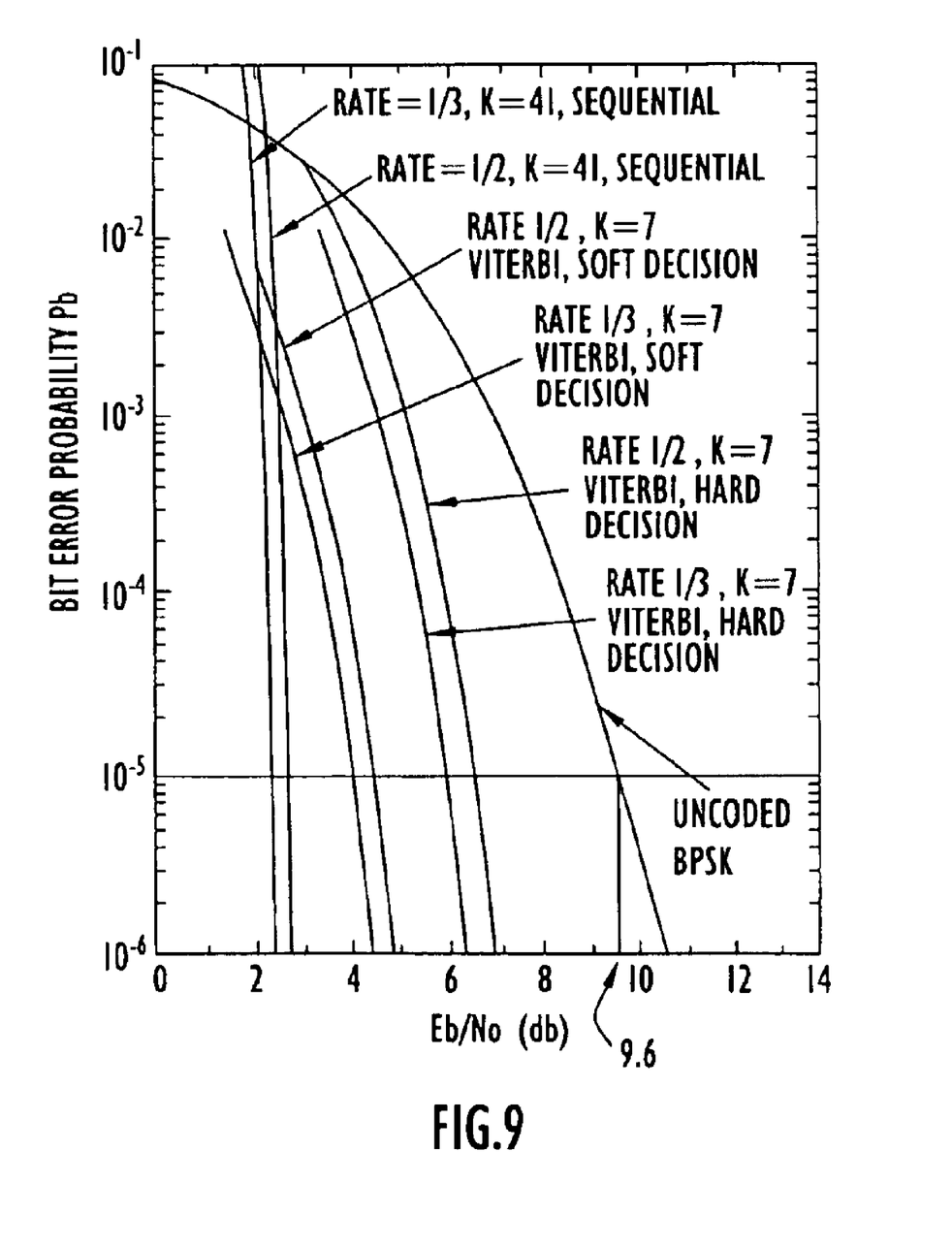
FIG. 9 is a graph depicting bit error rate curves for coded DSSS signals.

Take for example, the packet length. The system state transition attempts to maximize packet reliability. Packet reliability is a function of both the packet length and the bit error rate (BER). The packet length is a simple number, while the BER is a statistical quantity related to the Energy per bit over the Noise density (Eb/No), as well as the (error correcting) coding gain, as shown in FIG. 9. Thus, the selection of packet length must take into account the BER as well as the acceptable packet reliability. Specifically, $$BER=1-(Pkt_{Rel})^{1/Nb}, \text{ where } N_b \text{ is the number of bits in the packet.}$$

The BER corresponding to a number of packet lengths and packet reliabilities is shown in Table 1.

TABLE 1

| Packet Reliability => | 0.95 | 0.96 | 0.97 | 0.98 | 0.99 |
|---|---|---|---|---|---|
| Packet Length (bits) | | | BER | | |
| 2048 | $2.5 \times 10^{-5}$ | $1.99 \times 10^{-5}$ | $1.49 \times 10^{-5}$ | $9.86 \times 10^{-6}$ | $4.91 \times 10^{-6}$ |
| 4096 | $1.25 \times 10^{-5}$ | $9.97 \times 10^{-6}$ | $7.44 \times 10^{-6}$ | $4.93 \times 10^{-6}$ | $2.45 \times 10^{-6}$ |
| 8192 | $6.26 \times 10^{-6}$ | $4.98 \times 10^{-6}$ | $3.72 \times 10^{-6}$ | $2.47 \times 10^{-6}$ | $1.23 \times 10^{-6}$ |
| 16384 | $3.13 \times 10^{-6}$ | $2.49 \times 10^{-6}$ | $1.86 \times 10^{-6}$ | $1.23 \times 10^{-6}$ | $6.13 \times 10^{-7}$ |

When analyzing the received signal level, the node will select a power level which will be placed in the SSV. The selection process will then proceed with selecting other parameters. The combination of a short packet with a ½ rate code would not be very efficient; therefore, the corresponding parameter value will have the appropriate numeric value, as opposed to the short packet with a ¾ code.

Figure 10:
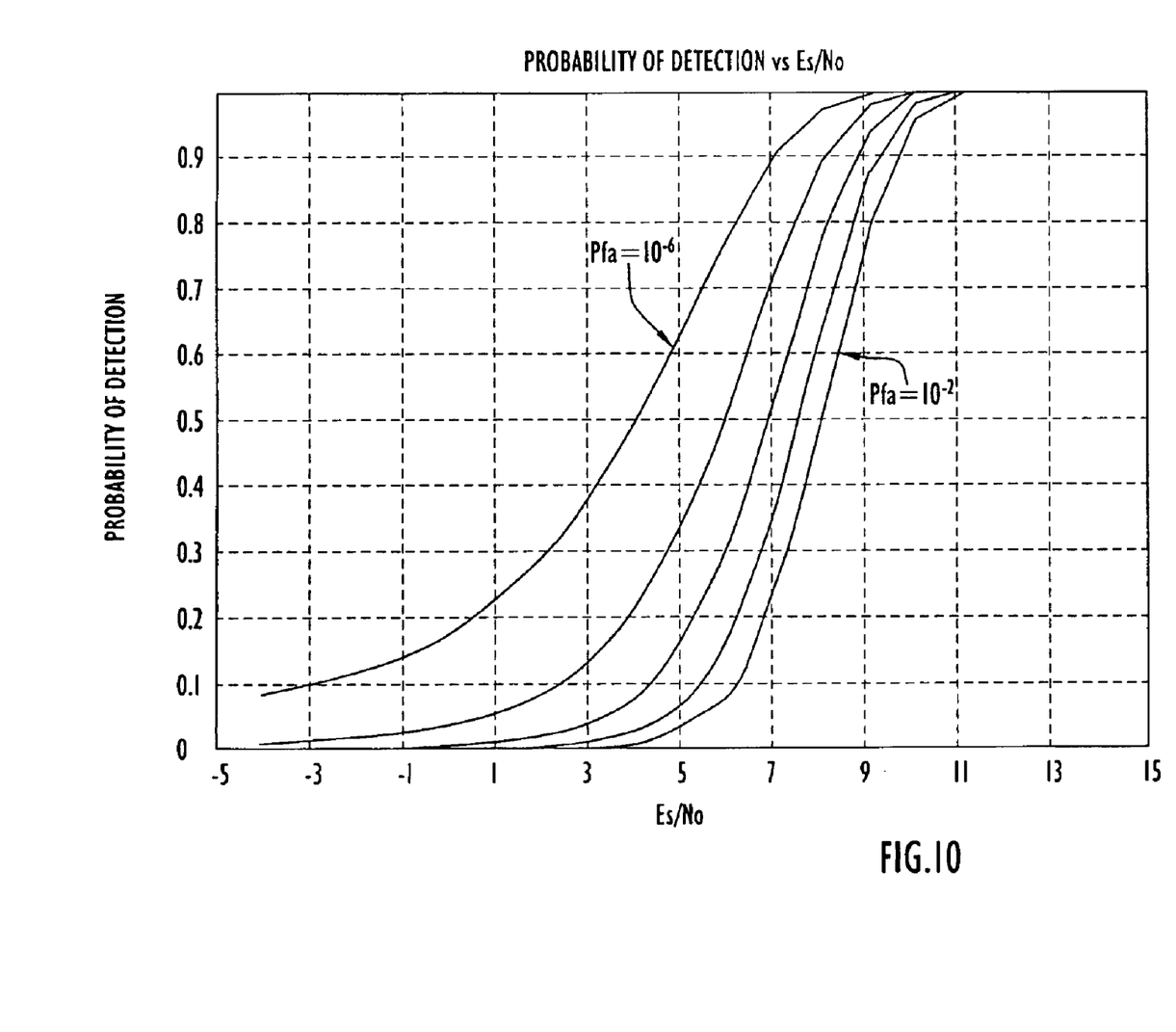
FIG. 10 is a graph depicting the probability of detection and probability of false acquisition for multiple dwell DSSS signal acquisition.

A similar process is realized when addressing the transmitted power in relation to the Acquisition Probability, shown in FIG. 10. The system incorporates a multiple acquisition (M of N detection) which increases the Probability of Detection ($P_d$) while minimizing the Probability of False Alarm ($P_{fa}$) with the minimum possible transmitted power. A power $P_t$ which would reach the destination at an Eb/No of 7.7 dB would give a $P_d$ of 99.9% with a $P_{fa}=10^{-6}$. This is, of course, an estimated power; however, this indicates that the node can use only eight acquisition words instead of sixteen, shortening the length of the RTS/CTS/MSG/ACK (and increasing the network efficiency).

The system will also adjust data rates and signal bandwidth to increase the received Es/No and hence decrease the Bit Error Rate (BER) and Packet Error Probabilities. This is then combined with the Forward Error Correction (FEC) code as well as multipath profile to account for the minimum necessary Fade Margin.

After constructing the $SSV_{constr}$, the node has two SSVs to consider: the SSV just received ($SSV_{prev}$) and the SSV just constructed ($SSV_{constr}$). While either of these SSVs may yield adequate performance, some deviations from one of these SSV in one or more of the vector coordinates (i.e., parameters) may provide superior performance. With the $SSV_{constr}$, although the parameter values derived from current channel characteristic can be expected to provide at least some minimum level of performance, the preliminary parameter selection process does not take into account the performance of the parameters in concert as a whole relative to other possible parameter combinations. Likewise, a better SSV may be available than the previously used SSV ($SSV_{prev}$). Accordingly, the next step in the system state transition process is to use one of these two SSVs to index the N-dimensional (in this example, eight-dimensional) table of weights to find an output SSV with which to transmit the next message.

Recall that each coordinate of the SSV may take on any one of a set of predetermined values. These values are arranged in some relative order, generally increasing or decreasing, such that adjacent values in the set represent incremental changes. For example, the data rate can take on the values of 8, 16, 32, 64, 128, 256, 512 and 1024 Kbps. If the data rate happened to be 32 Kbps, this could be represented by setting the value of the data rate index to "three". The same process can be indicate the value of each vector coordinate. For an SSV with eight coordinates (i.e., eight parameters), a particular SSV could be identified as $SSV_{3,4,8,2,2,1,3,1}$.

If the data rate is changed from 32 to 64 Kbps, this would represent a change of +1 in the value of this particular vector coordinate (data rate). Likewise, if the data rate is changed from 32 to 16 Kbps, this would represent a change of −1 in the value of this particular vector coordinate. By ordering the possible vector coordinate values and sequentially numbering these values (in this case, one to eight), relative differences between candidate SSVs under consideration can be measured in terms of integer differences (±N) in the values of the vector coordinates. For example, referring to the above-listed possible coordinate values, relative to the $SSV_{prev}$, the $SSV_{constr}$ may have a data rate that is +2 (256 Kbps versus 64 Kbps); a packet length that is −1 (128 bytes versus 256 bytes); a signal bandwidth that is +3 (16 MHZ versus 2 MHZ), etc.

If the $SSV_{constr}$ is within a predetermined N-dimensional distance metric of the $SSV_{prev}$, the $SSV_{constr}$ is assumed to be a good initial estimate of the SSV and is used to index the weight table. For example, if the date rate, packet length, signal bandwidth, etc. of the $SSV_{constr}$ do not deviate by more than a specified number of value increments from those values in the $SSV_{prev}$, the $SSV_{constr}$ would be used to index the weight table, and the $SSV_{prev}$ would not be used.

One possible criterion for assessing whether the $SSV_{constr}$ is sufficiently close to the $SSV_{prev}$ is to define a distance D in an N-Dimensional Vector Space Z as follows:

$$D(V_0, V_1) = \|v_{0,1} - v_{1,1}\| + \|v_{0,2} - v_{1,2}\| + \ldots + \|v_{0,N} - v_{1,N}\|$$

where $V_0$ and $V_1$ are elements (i.e. vectors of Z). Each vector $V_k$ has N coordinates $v_{1,out}\ v_N$. The double bars, i.e., $\|v\|$, indicate the absolute value in the euclidean integer sense. In this example, $V_0$ could be $SSV_{prev}$ and $V_1$ could be $SSV_{constr}$.

A neighborhood of a vector, i.e. a hypersphere of N dimensions can be defined as:

$$D(V_0, V_1) \leq R$$

where R is the radius of a "hypersphere". This will have the effect of bounding the values of the coordinates. This means that the two vectors must be pointing within a "hypersphere" of radius R which could be, for example, set equal to twenty-four in this particular example. Observe that this means that only one coordinate distance (difference) can be twenty-four and all others zero, or any combination that makes the sum of differences less or equal than twenty-four (or any other integer number suitable chosen). In the example given here, since each vector coordinate can take on eight possible values, the maximum possible deviation of any one coordinate is ±7.

If, by the N-dimensional distance metric chosen, the $SSV_{constr}$ deviates significantly from the $SSV_{prev}$ in one or more states, it is not assumed that the $SSV_{constr}$ is necessarily a better starting point than the $SSV_{prev}$ for finding a good SSV from the weight table. Accordingly, both the $SSV_{prev}$ and the $SSV_{constr}$ are used to search limited portions of the N-dimensional table of weights for the best SSV.

As previously described, the N-dimensional table of performance weights may contain numeric performance weights for millions of combinations of parameters. The search for the highest weight SSV is restricted to candidate SSVs whose coordinates have values that are within specific integer deviations from the values of the $SSV_{prev}$ or $SSV_{constr}$ being used to index the table. By way of non-limiting example, suppose the candidate SSVs to be searched included those whose parameter values deviated by no more the plus or minus one value for each parameter. This would restrict the search to no more than $3^8 = 6,561$ SSVs, since each of the eight parameter would be restricted to three possible values. Thus, suppose the data rate can take on the possible values of 8, 16, 32, 64, 128, 256, 512 and 1024 kbps. If the SSV used to index the table has a data rate of 64 kbps, only SSVs with data rates of 32, 64 or 128 kbps would be considered possible SSV candidates. Similar restrictions would apply to each of the other seven states (parameters).

In accordance with another approach, the above-described N-dimensional distance metric can be used to define a hyperspace neighborhood around the SSV being used to index the N-dimensional table, wherein only the SSVs within the hyperspace neighborhood will be candidate SSVs whose weights will be considered. For example, if the bounding radius R is set to four, only those SSVs whose index difference sum to four or less will be candidates. To give a concrete example, if the $SSV_{constr}$ being used to access the N-dimensional table, is $SSV_{2,2,2,2,2,2,2,2}$, then $SSV_{2,1,2,1,2,1,2,2}$ (D=3) would be a candidate but $SSV_{4,2,2,1,7,3,2,2}$ (D=9) would not be a candidate.

Furthermore, specific operational requirements could further restrict the range of the SSVs to be considered in the N-dimensional table. For example, a particular transmission may be restricted for one reason or another to a specific power level, bandwidth, frequency channel, etc. It will be understood that the example criterion of plus or minus one value increment present here is in no way limiting on the invention, and any range of values can be used. For example, a operational requirements may place a minimum value on the data rate or a maximum value on the transmit power.

The SSV with the highest weight among the candidate SSVs within the N-dimensional table is used as the SSV to send the next message. If both the $SSV_{prev}$ and the $SSV_{constr}$ are used to search the weight table, the highest weight SSV resulting from these searches is used.

The following example helps illustrates operation of the system state transition process. Suppose a node wishes to transmit full motion video. The node may construct an $SSV_{constr}$ as follows:

data rate must be 128 Kbps or greater (15 frames/second)
packet length must be 512 Bytes (4098 bits) or greater
signal bandwidth of 8 MHZ
frequency channel 1850 MHZ
code Channel subsequence s1 showing good autocorrelation properties for this frequency
transmitted power 16 dBm
multipath profile 4 branches within 3 dB of each other separated by more than 2 μsec
forward error correction ¾ rate convolutional code (k=7).

In the weight table, this SSV would show a value of "2" corresponding to medium performance, because the Processing Gain (PG), which is $10*\log 10(8\times10^6/128\times10^3)=18$ dB, would not allow more than three users in the CDMA channel. Also, with a strong multipath profile covering more than 2 μsec, a ¾ code would not perform adequately.

Upon searching the N-dimensional table of weights in the neighborhood of this SSV, an alternative SSVs may be identified having a bandwidth of 16 MHZ and ½ rate code, which SSV will have a weight with a numeric value greater than the originally selected SSV. Thus, the higher-weight SSV will be used to transmit the message. Again, in this process, the values assigned to each SSV are pre-computed; however, the selection of specific SSV used to access the weight table is based on real-time channel and/or neighbor information.

When searching a significant number of SSV weights in the N-dimensional table, the search operations can be performed in parallel using Application Specific Integrated Circuits (ASIC). This approach is differs from a conventional stored program computer device, where one instruction is executed at a time.

The above-described system state transition process (shown in FIG. 8) is performed for each message transmitted by a node. As will be appreciated, each node maintains a system state vector for each neighboring node with which it communicates, since channel conditions are unique to each channel, and the type of message or transmission requirements may vary for messages to different nodes. A specific experimental instantiation of this invention has been found to provide three orders of magnitude increase in data rates with five times less power over current tactical radios.

Furthermore, while the exemplary embodiment attempts to optimize certain performance metrics such as probability of acquisition and packet reliability, the principles of the present invention can be applied to optimize virtually any performance metric(s), depending upon the particular requirements of a communication system.

It will be appreciated that the above-described exemplary embodiment primarily involves peer-to-peer communications, wherein the peer nodes are used to relay messages, with control of routing and transmission parameters being handled at the peer node level as opposed to a base station or central controller. This arrangement provides a number of potential advantages, including, but not limited to: reduced message traffic and increased available bandwidth due to elimination of network hierarchy; reduced power consumption; reduced vulnerability to single-point failure (particularly important in hostile environments encountered in military operations). Nevertheless, the present invention does not preclude the use of base stations. For example, a network of nodes communicating on a peer-to-peer basis may nevertheless require some degree of centralized control for purposes of communicating with other networks or for billing subscribers. A central gateway could be used to route message traffic between a network node to another network and track subscriber usage for billing purposes.

In the exemplary embodiment, an N-dimensional table of pre-computed weights is used to provide a relative indication of which combinations of parameters can be expected to perform better than others. As previously explained, the calculations required to generate these weights involve computing metrics such as packet reliability, probability of acquisition, probability of detection and false alarm, bit error rate, etc., for each particular set of parameters in accordance with well-known principles and relationships. Alternatively, these vector weights can be calculated in real time for the set of candidate vectors with sufficient computational resources. This would eliminate the need to store a large table of weights and would potentially permit greater flexibility in terms of what factors and metrics are considered while computing a particular system state transition.

While the exemplary embodiment of the present invention involves a mobile, multimedia communication system employing a CSMA/CA protocol to communicate over a wireless LAN, it will be appreciated that the present invention is not limited to this type of network and can be applied in networks transmitting virtually any type of information or signals using any communication protocols over any type of communication media.

Having described preferred embodiments of new and improved methods and apparatus for organizing selection of operational parameters in a communication system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of selecting operational parameters for transmitting a signal over a communication channel of a communication network, the method comprising the steps of:

(a) determining RF conditions on the communication channel from a received signal transmitted over the communication channel;

(b) selecting a preliminary set of parameter values for the operational parameters based on the RF conditions determined from the received signal;

(c) using the preliminary set of parameter values to identify candidate sets of parameter values as potential candidates for transmitting the signal, an expected performance value being associated with each of the candidate sets of parameters, wherein determination of the expected performance value is independent of the RF conditions determined from the received signal;

(d) selecting from among the candidate sets of parameter values a selected set of parameter values having the expected performance value indicating a highest expected performance among the candidate sets of parameter values, such that selection of the selected set of parameter values from among the candidate sets of parameter values is independent of the RF conditions determined from the received signal; and (e) transmitting the signal on the communication channel using the selected set of parameter values.

2. The method of claim 1, further comprising the steps of:
(f) prior to step (d), using a previous set of parameter values with which the received signal was transmitted to identify additional candidate sets of parameter values for transmitting the signal if the previous set of parameter values differs from the preliminary set of parameter values by more than a predetermined amount; and
wherein the candidate sets of parameters in step (d) include the additional candidate sets of parameter values.

3. The method of claim 1, wherein step (b) includes forming a system state vector from the preliminary set of parameter values, and steps (c) and (d) carry out a system state transformation on said system state vector.

4. The method of claim 1, wherein the expected performance values are pre-computed weights stored in a table.

5. The method of claim 1, wherein the preliminary set of parameters includes at least one of: data rate, packet length, signal bandwidth, frequency channel, code channel, transmit power, multipath profile and forward error correction scheme.

6. The method of claim 1, wherein the determined RF conditions include at least one of: received signal power, multipath characteristics and interference characteristics.

7. The method of claim 1, wherein the signal being transmitted contains at least one of control, audio, video and data information.

8. The method of claim 1, wherein the candidate sets of parameter values are selected from among possible sets of parameter values based on the preliminary set of parameter values.

9. The method of claim 1, wherein the RF conditions are determined at a same node that transmits the signal with the selected set of parameter values, such that the received signal is received by, not transmitted from, said same node.

10. The method of claim 2, wherein the previous set of parameter values used to transmit the received signal is indicated in the received signal.

11. The method of claim 4, wherein the preliminary set of parameter values is used to index the table of pre-computed weights, such that the candidate sets of parameter values are those within a predetermined number of indices of the preliminary set of parameter values.

12. A communication node for communicating with other nodes in a network over communication channels, comprising:
a receiver configured to process a received signal transmitted over a communication channel to determine RF conditions on the communication channel;
a processor configured to select a preliminary set of parameter values for the operational parameters based on the RF conditions determined from the received signal, and using the preliminary set of parameter values to identify candidate sets of parameter values as potential candidates for transmitting the signal, an expected performance value being associated with each of the candidate sets of parameters, wherein determination of the expected performance value is independent of the RF conditions determined from the received signal, said processor selecting from among the candidate sets of parameter values a selected set of parameter values having the expected performance value indicating a highest expected performance among the candidate sets of parameter values, such that selection of the selected set of parameter values from among the candidate sets of parameter values is independent of the RF conditions determined from the received signal; and
a transmitter configured to transmit the signal on the communication channel using the selected set of parameter values.

13. The communication node of claim 12, wherein said communication node is a mobile communication device.

14. The communication node of claim 12, wherein said communication node communicates with other nodes on a peer-to-peer basis.

15. The communication node of claim 12, wherein said communication node is a multimedia communication device capable of transmitting and receiving audio, video and data messages.

16. The communication node of claim 12, wherein said processor uses a previous set of parameter values with which the received signal was transmitted to identify additional candidate sets of parameter values for transmitting the signal if the previous set of parameter values differs from the preliminary set of parameter values by more than a predetermined amount; and
wherein the additional candidate sets of parameter values are among the candidate sets of parameter values from which the selected set of parameter values is chosen.

17. The communication node of claim 12, wherein said processor forms a system state vector from the preliminary set of parameter values, and carries out a system state transformation on said system state vector to choose the selected set of parameter values.

18. The communication node of claim 12, wherein the expected performance values are pre-computed weights, the node further comprising a memory for storing the pre-computed weights in a table, wherein the selected set of parameter values has a pre-computed weight corresponding to a highest performance among the candidate sets of parameter values.

19. The communication node of claim 12, wherein the preliminary set of parameters includes at least one of: data rate, packet length, signal bandwidth, frequency channel, code channel, transmit power, multipath profile and forward error correction scheme.

20. The communication node of claim 12, wherein the determined RF conditions include at least one of: received signal power, multipath characteristics and interference characteristics.

21. The communication node of claim 12, wherein said communication node communicates on the communication channel using carrier sense multiple access with collision avoidance.

22. The communication node of claim 12, wherein said communication node defines the communication channel using code division multiple access and frequency division multiple access.

23. The communication node of claim 12, wherein said communication node transmits a direct sequence spread spectrum signal.

24. The communication node of claim 12, wherein said communication node selects a set of parameter values for each message transmitted by said communication node.

25. The node of claim 12, wherein the processor selects the candidate sets of parameter values from among possible sets of parameter values based on the preliminary set of parameter values.

26. The node of claim 16, wherein the previous set of parameter values used to transmit the received signal is indicated in the received signal.

27. The node of claim 18, wherein the processor uses the preliminary set of parameter values to index the table of pre-computed weights, such that the candidate sets of parameter values are those within a predetermined number of indices of the preliminary set of parameter values.

28. A communication system, comprising:

a plurality of nodes communicating over communication channels, each of said nodes including: a receiver configured to process a received signal transmitted over a communication channel to determine RF conditions on the communication channel; a processor configured to select a preliminary set of parameter values for the operational parameters based on the RF conditions determined from the received signal, and using the preliminary set of parameter values to identify candidate sets of parameter values as potential candidates for transmitting the signal, an expected performance value being associated with each of the candidate sets of parameters, wherein determination of the expected performance value is independent of the RF conditions determined from the received signal, said processor selecting from among the candidate sets of parameter values a selected set of parameter values having the expected performance value indicating a highest expected performance among the candidate sets of parameter values, such that selection of the selected set of parameter values from among the candidate sets of parameter values is independent of the RF conditions determined from the received signal; and a transmitter configured to transmit the signal on the communication channel using the selected set of parameter values.

29. The communication system of claim 28, wherein each node is a mobile communication device.

30. The communication system of claim 28, wherein nodes in said communication system communicate with each other on a peer-to-peer basis.

31. The communication system of claim 28, wherein each node is a multimedia communication device capable of transmitting and receiving audio, video and data messages.

32. The communication system of claim 28, wherein said processor uses a previous set of parameter values with which the received signal was transmitted to identify additional candidate sets of parameter values for transmitting the signal if the previous set of parameter values differs from the preliminary set of parameter values by more than a predetermined amount; and wherein the additional candidate sets of parameter values are among the candidate sets of parameter values from which the selected set of parameter values is chosen.

33. The communication system of claim 28, wherein said processor forms a system state vector from the preliminary set of parameter values, and carries out a system state transformation on said system state vector to choose the selected set of parameter values.

34. The communication system of claim 28, wherein the expected performance values are pre-computed weights and each node further comprises a memory for storing the pre-computed weights in a table, wherein the selected set of parameter values has a pre-computed weight corresponding to a highest performance among the candidate sets of parameter values.

35. The communication system of claim 28, wherein the preliminary set of parameters includes at least one of: data rate, packet length, signal bandwidth, frequency channel, code channel, transmit power, multipath profile and forward error correction scheme.

36. The communication system of claim 28, wherein the determined RF conditions include at least one of: received signal power, multipath characteristics and interference characteristics.

37. The communication system of claim 28, wherein said communication system employs carrier sense multiple access with collision avoidance.

38. The communication system of claim 28, wherein said communication system employs code division multiple access and frequency division multiple access to define communication channels.

39. The communication node of claim 28, wherein said node transmit direct sequence spread spectrum signals.

40. The communication node of claim 28, wherein each node selects a set of parameter values for each message transmitted.

41. The system of claim 28, wherein the processor selects the candidate sets of parameter values from among possible sets of parameter values based on the preliminary set of parameter values.

42. The system of claim 28, wherein the RF conditions are determined at a same node that transmits the signal with the selected set of parameter values, such that the received signal is received by, not transmitted from, said same node.

43. The system of claim 32, wherein the previous set of parameter values used to transmit the received signal is indicated in the received signal.

44. The system of claim 34, wherein the processor uses the preliminary set of parameter values to index the table of pre-computed weights, such that the candidate sets of parameter values are those within a predetermined number of indices of the preliminary set of parameter values.

* * * * *